(12) United States Patent
Shi et al.

(10) Patent No.: US 12,409,870 B2
(45) Date of Patent: Sep. 9, 2025

(54) TRACTION COUPLING

(71) Applicant: Voith Patent GmbH, Heidenheim (DE)

(72) Inventors: Minzhe Shi, Braunschweig (DE); Ioan Deac, Hildesheim (DE); Yves Dereymaeker, Adlum-Harsum (DE)

(73) Assignee: Voith Patent GmbH, Heidenheim (DE)

( * ) Notice: Subject to any disclaimer, the term of this patent is extended or adjusted under 35 U.S.C. 154(b) by 960 days.

(21) Appl. No.: 17/535,471

(22) Filed: Nov. 24, 2021

(65) Prior Publication Data

US 2022/0153319 A1    May 19, 2022

Related U.S. Application Data

(63) Continuation of application No. PCT/EP2020/062493, filed on May 6, 2020.

(30) Foreign Application Priority Data

May 28, 2019    (DE) ...................... 10 2019 114 237.7

(51) Int. Cl.
    B61C 17/08    (2006.01)
    B61G 3/00    (2006.01)
    (Continued)

(52) U.S. Cl.
    CPC ............... B61C 17/08 (2013.01); B61G 3/00 (2013.01); F16N 7/00 (2013.01); *B61G 3/04* (2013.01); *B61G 5/08* (2013.01)

(58) Field of Classification Search
    CPC . B61C 17/08; F16N 7/00; F16N 21/00; F16N 29/00; F16N 2250/00; F16N 2260/00; F16N 2270/00; F16N 2280/00
    (Continued)

(56) References Cited

U.S. PATENT DOCUMENTS

| 984,997 A | 2/1911 | Beamer |
| 1,497,329 A | 6/1924 | Goodall |

(Continued)

FOREIGN PATENT DOCUMENTS

| DE | 6902444 | 6/1969 |
| DE | 10 2008 038 059 A1 | 2/2010 |

(Continued)

OTHER PUBLICATIONS

Notification of the Transmission of the International Search Report and Written Opinion of the International Search Authority or Declaration dated Aug. 7, 2020 for International Application No. PCT/EP2020/062493 (14 pages).

(Continued)

*Primary Examiner* — S. Joseph Morano
*Assistant Examiner* — Heaven R Buffington
(74) *Attorney, Agent, or Firm* — TAYLOR & EDELSTEIN, PC

(57) ABSTRACT

A traction coupling including a coupling rod, a bearing block, and a coupling head supported by the coupling rod. The coupling rod extends in an axial direction from an attachment end to the coupling head, in a region of the attachment end, the coupling head is mounted in a pivotable manner on the bearing block in order to be attached to a rail vehicle. The traction coupling also including at least one lubricating device having at least one lubricant source and at least one lubricant line connected to the lubricant source for lubrication of joints and/or movement points in the traction coupling. The joints and/or movement points of various components of the following group of components of the traction coupling are lubricated with the lubricating device the coupling rod, the coupling head, and the bearing block.

13 Claims, 18 Drawing Sheets

(51) Int. Cl.
*F16N 7/00* (2006.01)
*B61G 3/04* (2006.01)
*B61G 5/08* (2006.01)

(58) Field of Classification Search
USPC .................................... 213/75 R; 184/6, 14
See application file for complete search history.

(56) References Cited

U.S. PATENT DOCUMENTS

| | | | |
|---|---|---|---|
| 3,207,324 | A | 9/1965 | Blake |
| 5,454,475 | A | 10/1995 | Kaufhold |
| 6,578,669 | B2 * | 6/2003 | Kast .................. B61K 3/02 |
| | | | 184/3.2 |
| 2014/0142791 | A1 | 5/2014 | Boehni et al. |

FOREIGN PATENT DOCUMENTS

| | | | |
|---|---|---|---|
| EP | 1 736 392 A1 | 12/2006 | |
| EP | 2537730 A1 * | 12/2012 | ............. B61G 11/18 |
| GB | 191401442 | 1/1915 | |
| JP | 50-60707 | 6/1975 | |
| JP | 52-140513 | 10/1977 | |
| WO | 02/02381 A2 | 1/2002 | |

OTHER PUBLICATIONS

German Office Action dated Mar. 27, 2020 for German Application No. 10 2019 114 237.7 (10 pages).

\* cited by examiner

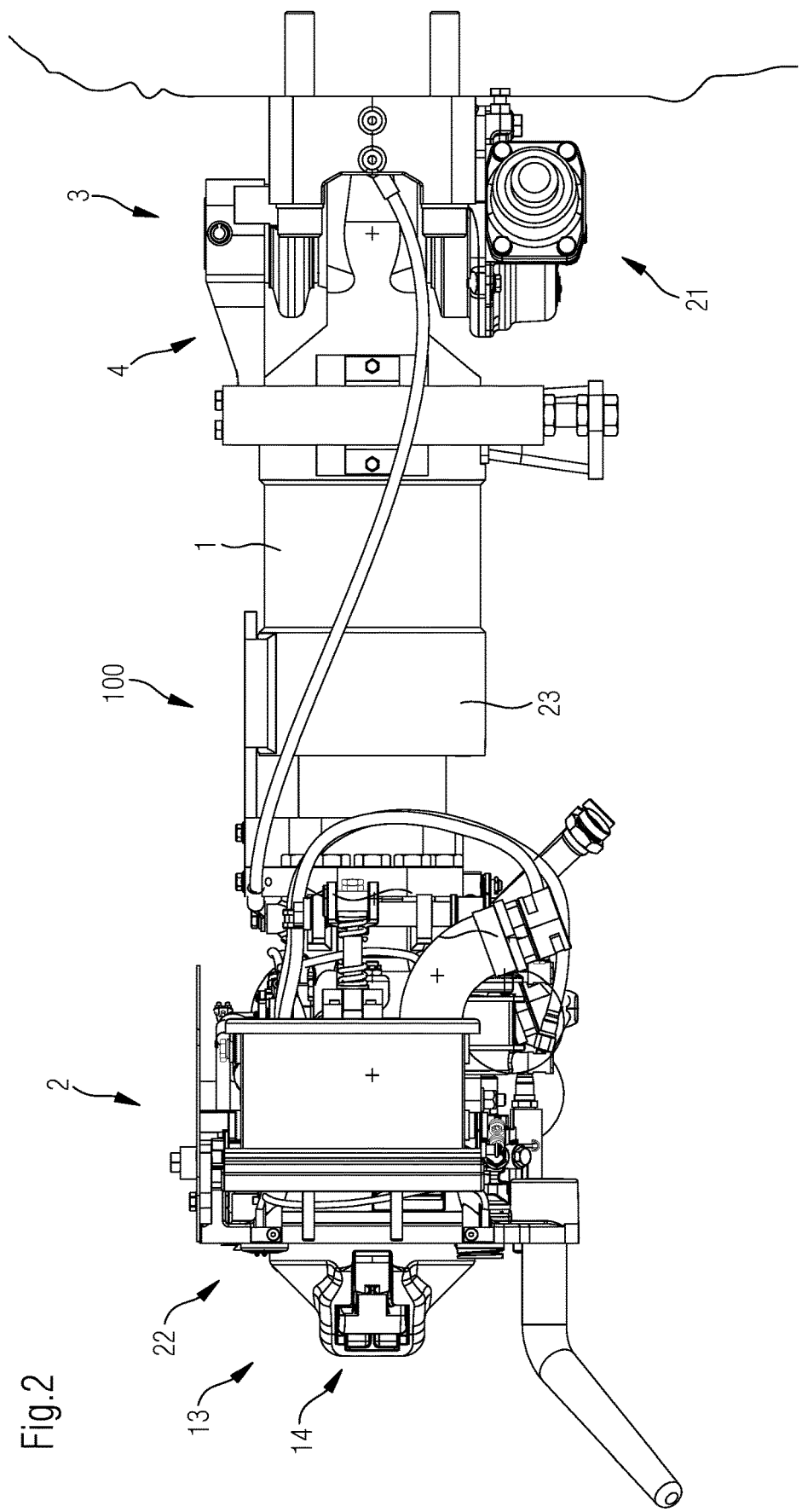

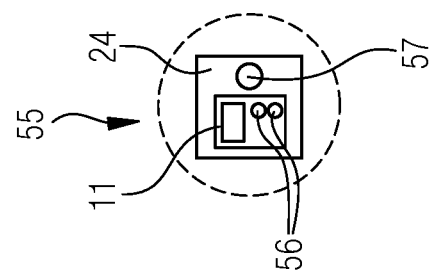
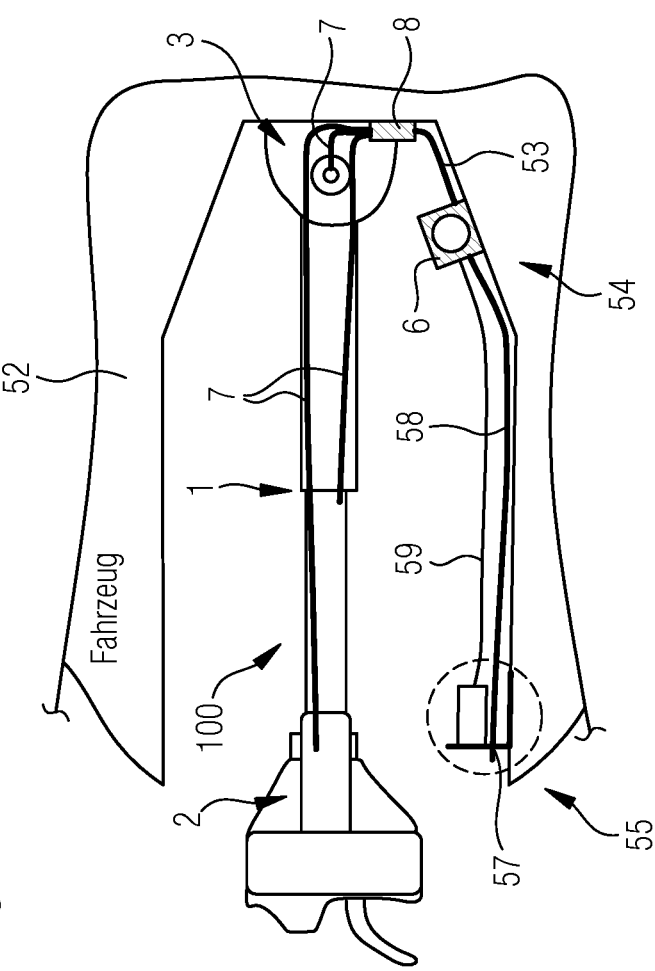

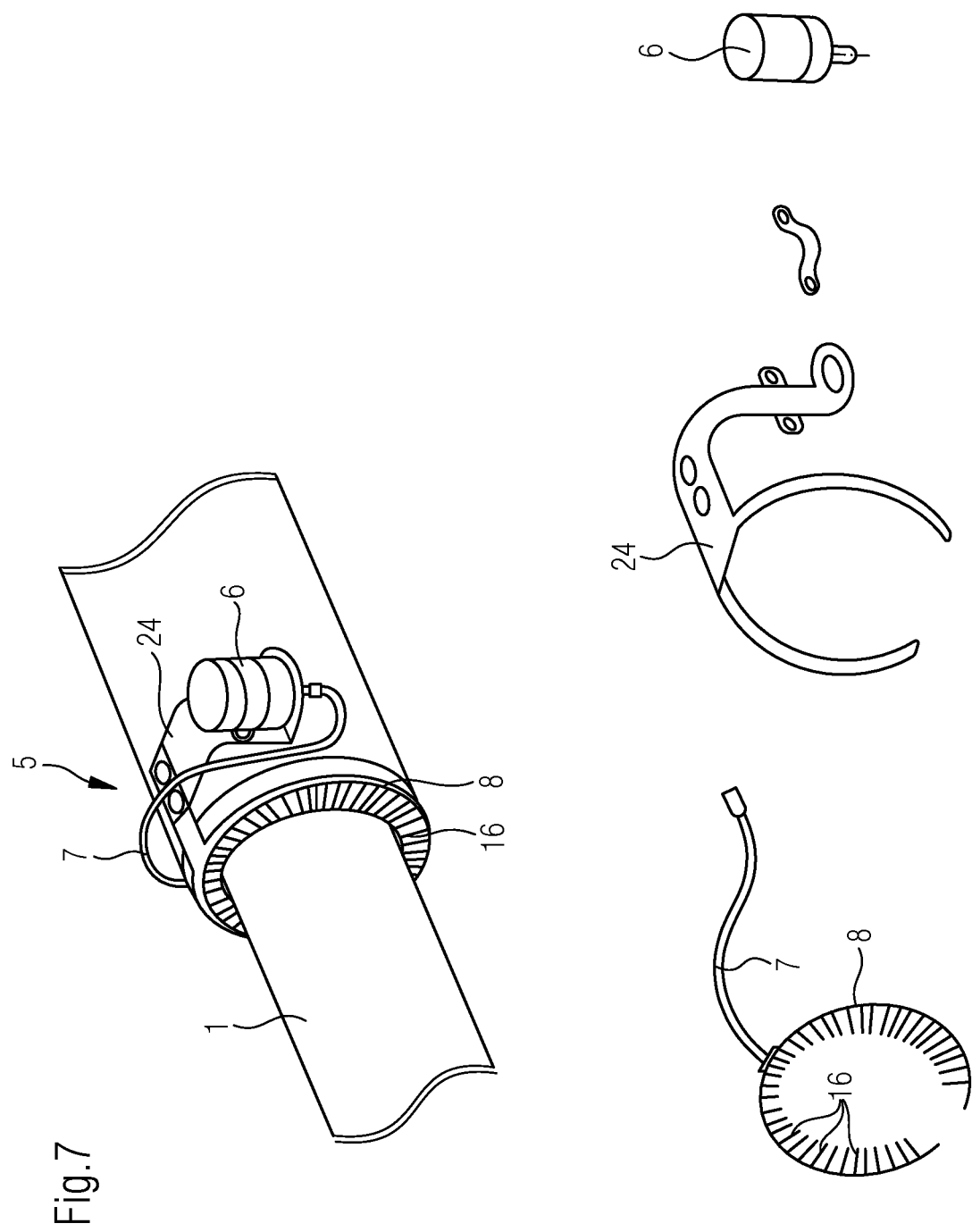

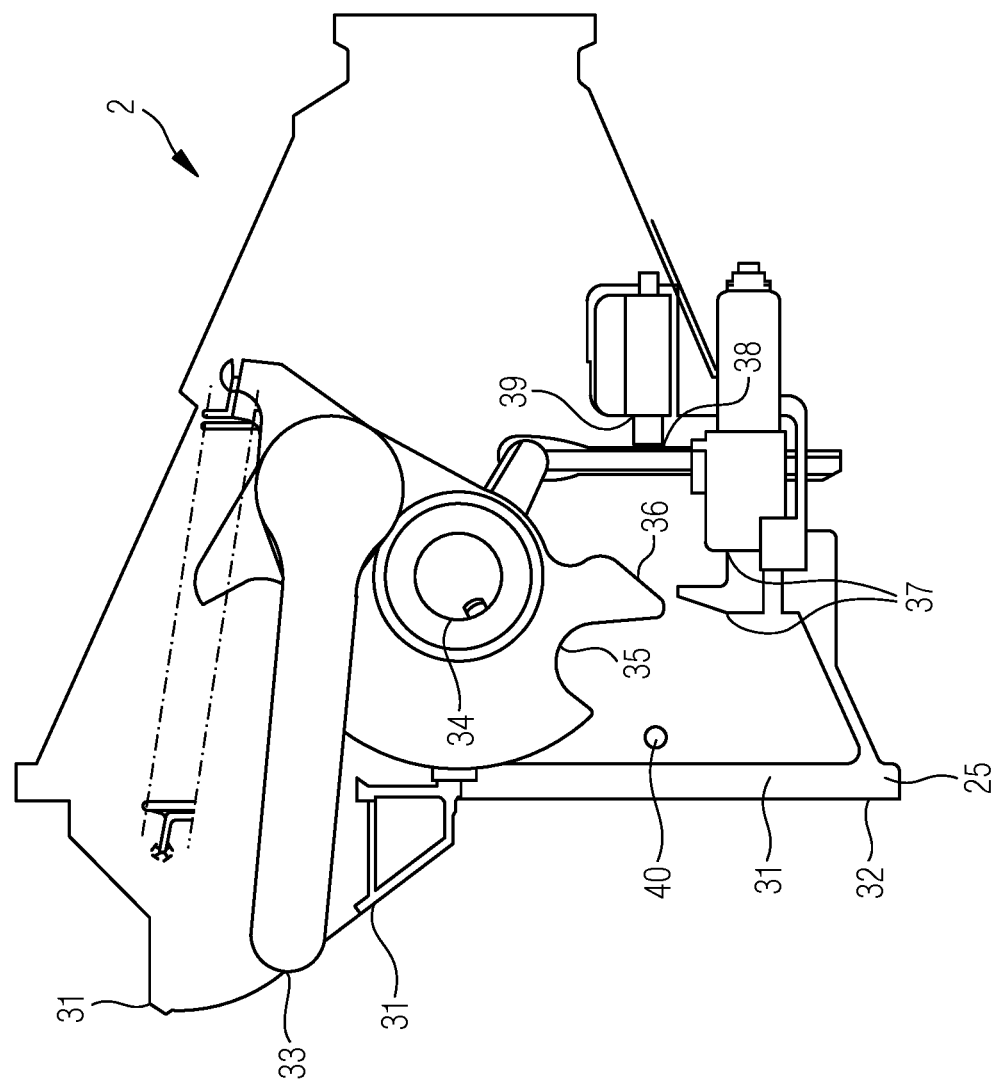

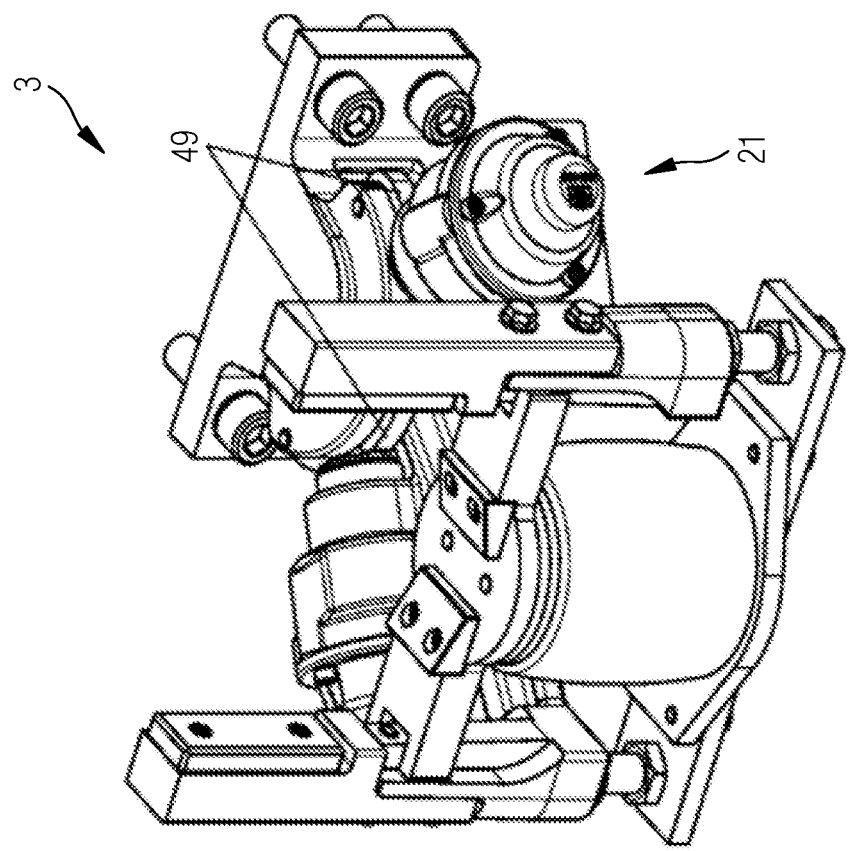
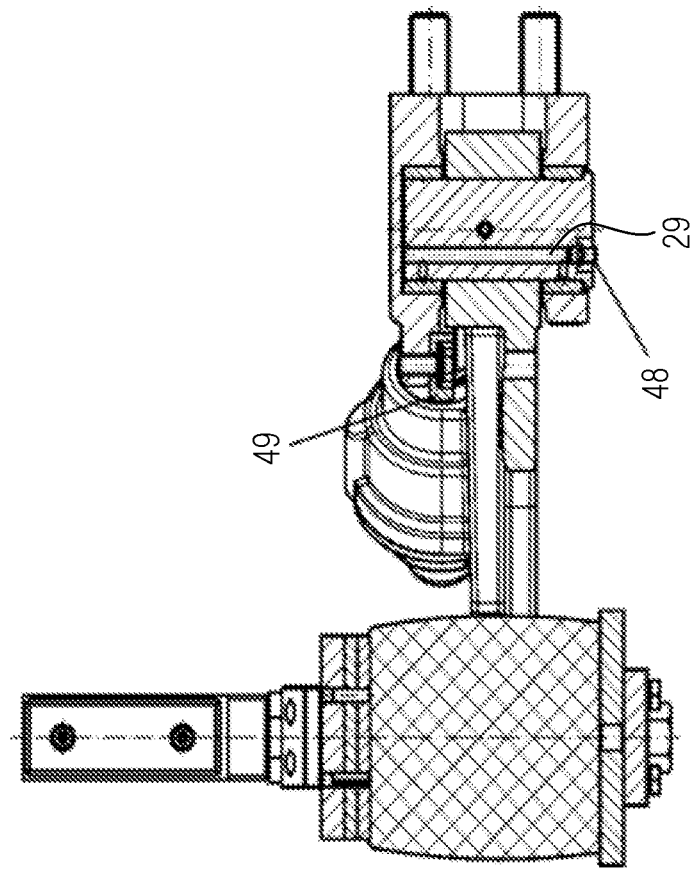
Fig.16

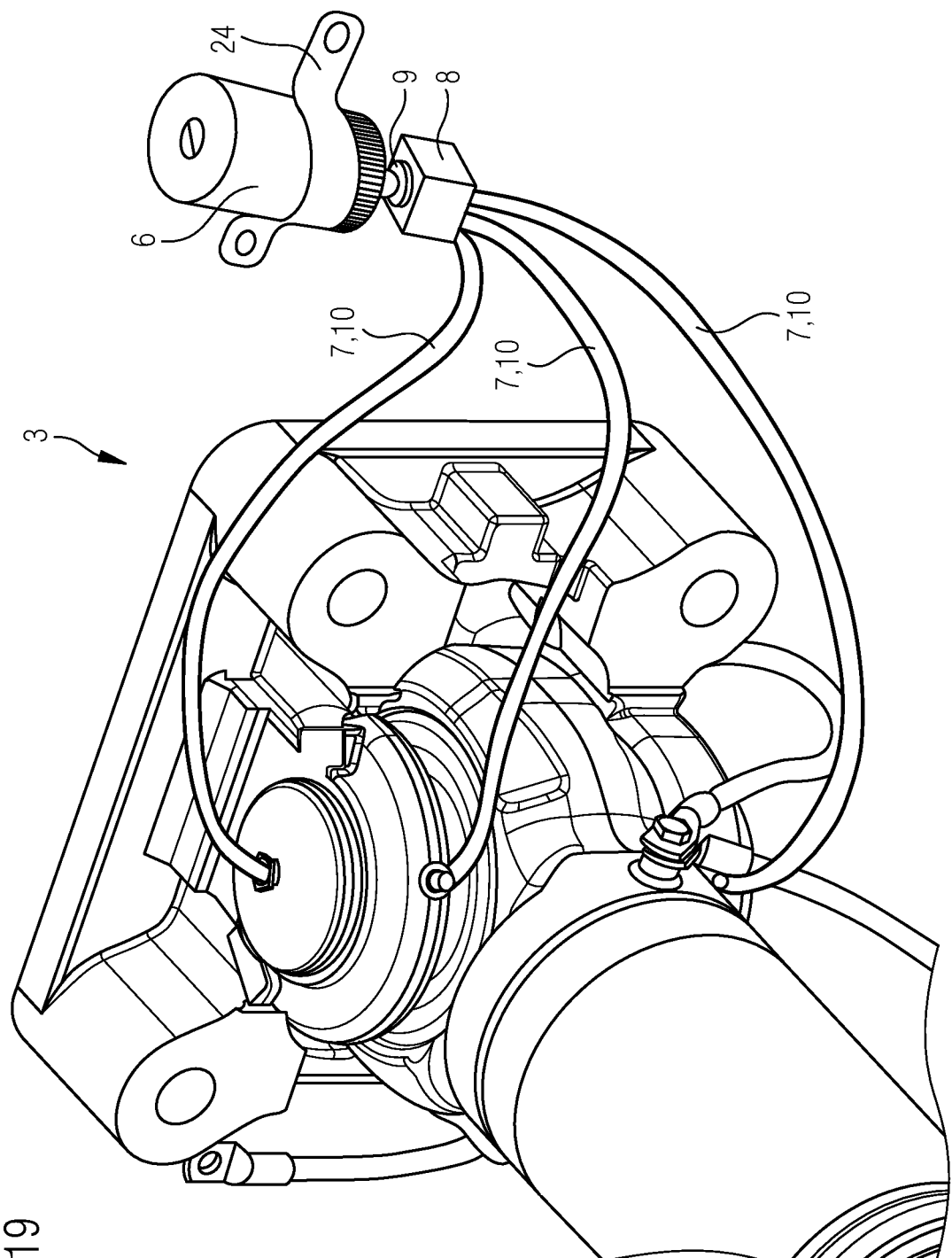

TRACTION COUPLING

CROSS REFERENCE TO RELATED APPLICATIONS

This is a continuation of PCT application No. PCT/EP2020/062493, entitled "TRACTION COUPLING", filed May 6, 2020, which is incorporated herein by reference.

BACKGROUND OF THE INVENTION

1. Field of the Invention

The present invention relates to a traction coupling having a coupling rod and having a coupling head supported by the coupling rod.

2. Description of the Related Art

A traction coupling is disclosed in EP 2 537 730 B1. The traction coupling includes a coupling head, and a coupling rod. The coupling head has an impact surface that is to be lubricated with a lubricant. A lubricant dispenser and at least one lubricant line connected to the lubricant dispenser is provided for this purpose, wherein the lubricant is directed by way of the line to the impact surface. The lubricant line may include a branch line to lubricate additional functional surfaces of moving parts in the coupling.

EP 1 736 392 B1 discloses a lubricant reservoir in a pivot bolt of a bearing block of a traction coupling for continuous demand-based lubrication of bearing points. The reservoir is refillable.

DE 10 2008 038 059 A1 discloses a traction coupling having a coupling fork and a coupling connecting element, wherein the coupling connecting element includes a bearing with a bearing outer ring, a rotating bearing inner ring inside the bearing outer ring and a coupling bolt having two ends and passing through a bore of the bearing inner ring. The bearing is lubricated with a lubricating oil.

WO 02/02381 discloses a drive unit, in particular an underfloor drive unit for driving a set of wheels for use in rail vehicles, wherein a lubricant supply system is provided which extends to the grease nipples in a cardan shaft head.

The cited traction couplings serve to couple vehicles, specifically carriage parts of a rail vehicle, wherein the couplings must provide high operational reliability even under cold or ambient humidity conditions. As a general rule, reset devices should be provided which, in uncoupled state ensure a permanent center position function of a respective traction coupling. When the vehicles are moved together, the coupling heads of the traction couplings make contact, center themselves and automatically produce a secure mechanical connection of the traction coupling. In particular the air couplings make contact with one another simultaneously and connect the airlines of the different carriages. At the same time, electric couplers provided in the traction coupler can be automatically moved forward and connected with one another.

Decoupling can be remotely controlled from the vehicle and can occur manually, directly at the respective coupling. One device for automatic decoupling unlocks the coupling locks and the traction couplings should be ready again for coupling as soon as the vehicles are moved apart. The electric couplings are separated advantageously automatically and retracted again respectively backward. The same applies to the air couplings which can also be separated advantageously automatically.

To protect the support and contact surfaces against wear, sufficient lubrication is required. In practice, conventional lubrication with various lubricants provided in the traction coupling are predominantly utilized. Lubrication is implemented for example with a manual device, for example a grease pump which operates manually or pneumatically, a lubrication gun, etc. The lubrication interval is generally determined based on manufacturers recommendation of the respective traction coupling.

Within the framework of smaller maintenance measures, re-lubrication of easily accessible lubricating points can occur directly on the rail vehicle, even outside a workshop. Only relevant manual devices must be available which are notably included as standard equipment in the rail vehicle.

In addition to refilling of the respectively provided lubricant reservoir by way of the lubricating nipples, exposed impact surface are generally also regularly lubricated or are provided with a suitable corrosion protection. In this description, impact surfaces are understood to be all surfaces provided outside of a joint or respectively outside of movement points which are either exposed to adverse environmental conditions or upon which force is applied, for example in the case of pressure surfaces of the plunger guide on the center piece, pressure surfaces of the piston rods on the center piece and actuation surfaces of cams for valves and limit switches, and stop faces of a stop limit, visible surfaces on regenerative buffers, the guide surfaces in the coupling cone and the coupling funnel, the impact surface of a coupling face plate, the coupling eyelet, the hook mount of a center piece, the backside of a center piece, the pressure surface of the plunger guide and the pressure surface of the spring bearing.

Movement points which, conventionally and according to the current invention are advantageously regularly lubricated, are for example running surfaces and piston rods of pneumatic cylinders, valve guides, pivot points in bolts, movement points in operating linkages and running surfaces of cam plates.

Even though the individual steps for re-lubrication are generally specified in manufacturers manuals and the specifications in regard to maintenance intervals are precise, the specifications are not always adhered to. On the one hand, this is due to the fact that a downtime is associated with the maintenance of rail vehicles, resulting in additional complications in rail traffic and in additional costs. On the other hand, no reliable assurances can be made that the re-lubrication is carried out with the necessary care in order to obtain the desired result.

Consequently, increased wear occurs in traction couplings due to inadequate or missing maintenance even if individual lubrication points in the traction coupling head are lubricated with an automatic lubricating device according to the state of the art referred to at the beginning, since thereby wear occurs in another location in the sequence of transfer of force in this type of traction coupling.

What is needed in the art is a traction coupling wherein the service life is improved and down times for maintenance are reduced.

SUMMARY OF THE INVENTION

A traction coupling according to the present invention includes a coupling rod and a coupling head supported on the coupling rod. The coupling rod extends in an axial direction from an attachment end to the coupling head and, in the region of the attachment end is mounted in a pivotable manner on a bearing block of the traction coupling.

According to the present invention a lubricating device is provided which includes at least one lubricant source and at least one lubricant conveying lubricant line connected to the lubricant source for lubrication of joints and/or movement points in the traction coupling.

According to the present invention, joints and/or movement points of various components of the following group of components of the traction coupling are lubricated with the at least one lubricating device:
coupling rod
coupling head
bearing block.

Based on the fact that at least two of the aforementioned different components, or preferably all three of the aforementioned components are lubricated with the lubrication device, the wear in all components in the transfer chain of force in a traction coupling can be reduced, so that the service life as a whole of the traction coupling can be prolonged and down times for maintenance are reduced.

According to an advantageous embodiment of the present invention at least one common lubricant source for lubrication of joints and/or movement points of various components in the group of components is provided. This means that from a single central lubricant source joints and/or movement points of various components are being lubricated by way of respectively provided cross-component lubricant lines.

At least one lubricant distributer is preferably provided between the lubricant source and the various joints and/or movement points of a component and/or of various components.

Preferably, several lubricant distributors are provided, wherein in particular a dedicated lubricant distributor is assigned to each component. Each lubricant distributor has a comparatively larger number of lubricant discharge lines than lubricant supply lines in order to enable the distribution function.

Placement of the central lubricant source occurs either on one of the components of the traction coupling or preferably in the surrounding of the connection, in particular on the rail vehicle supporting the coupling. The first option has the advantage of providing the traction coupling with the lubricant supply system as a complete preassembled unit, wherein the lubricant supply occurs independently of the connection surroundings.

The placement of the central lubricant source in the surroundings of the coupling, in particular on the rail vehicle has the advantage that the increase of weight on the coupling due to the lubricant system—which is to be considered in the design of the coupling—is limited only to the necessary components, such as distributor and lubricant lines and that the bulk of the weight is supported on the vehicle. In particular, a central lubricant reservoir can be arranged on the vehicle, supplying the individual components of the coupling by way of respective lubricant lines. According to a first embodiment, this lubricant source may be self-sufficient, in other words, may be assigned only to the coupling. In a further development in this case the lubricant source can be designed with a service unit for at least indirect notification of essential refilling and for actual implementation of refilling.

In addition, with such an arrangement integration into a lubricant overall supply system on the rail vehicle is more easily possible in a second embodiment. The lubricant source can herein be a central lubricant source assigned to the vehicle, wherein the supply of the central lubricant source of the coupling occurs from the latter, for example by way of a distributor on the vehicle. The supply can occur automatically.

According to an additional embodiment of the invention a lubricant source is provided for each component in the aforementioned group of components. This means that at least one lubricant source is available for the coupling rod, moreover at least one lubricant source for the coupling head and moreover at least one lubricant source for the bearing block. The lubricant amounts can thus be more easily designed component-dependent and the line connections to the lubrication points can be kept short.

The respective lubricant source is preferable fastened to the respective component or is integrated into the respective component. For example, a protective housing is provided which accommodates the lubricant source and in particular a control device which controls lubricant delivery from the lubricant source. The control device can include a drive and/or a conveying device for the lubricant out of the lubricant source. The control device can include a valve.

In all cases, the lubricant lines may, for example, include passages and/or channels in components and/or flexible hose lines and/or rigid lines on components and/or between components.

According to one embodiment of the present invention, the lubricant sources with the respective lubricant lines of various components connected thereto are separated from one another. This means, that always at least one designated lubricant source is allocated to the two or three components, with one or several lines allocated to the lubricant source leading to the at least one or to several joints and/or movement point in the component. Conversely, there is no connection between the lubricant source or sources and lubricant lines of the one component and the lubricant sources and lubricant lines or joints and/or movement points of the other components.

At least one lubricant distributor is preferably provided between the at least one lubricant source and various joints and/or movement points of one component and/or various components. Preferably, several lubricant distributors are accordingly provided, wherein in particular a designated lubricant distributor is allocated to each lubricant source. Each lubricant distributor has a comparatively greater number of lubricant discharges than lubricant feeds in order to make the distribution function possible.

It is especially preferred if at least one control device is provided which is designed to control the lubricant delivery from the at least one lubricant source, so that the delivery of lubricant occurs continuously. According to an alternate embodiment the control unit is designed so that the delivery of lubricant occurs from the at least one lubricant source at regular intervals or in a discontinuous manner based on a requirement request. The requirement request may for example occur by way of a lubricant sensor which is connected to the respective joint and/or movement point and detects a lubricant status at the joint and/or movement point, and/or by way of a pressure sensor in a lubricant line.

Below is a list of joints and/or movement points in a traction coupling, which are lubricated with the lubricating device in the traction coupling according to the current invention. Individual coupling joints and/or movement points can herein be lubricated in an isolated manner, or collective lubrication is also possible. Preferably, at least one of the cited joints and/or movement points is lubricated:
one or several joints or pivot points between two components of the traction coupling;

one or more movement points between two components movable relative to each other in the axial direction or perpendicularly or angularly thereto;

one or more movement points between two components movable relative to each other in the circumferential direction to the axial direction;

one or more movement points on actuating mechanisms of one or more components integrated in the coupling head such as an electric coupling and/or an air coupling;

one or more outside surfaces on one or more components;

one or more inside surfaces on one or more components; and one or more interior spaces.

The lubricating device may, for example, include at least one lubricant spray head for spraying of a surface with lubricant. Such a spray head is especially suitable for interior surfaces or outside surfaces of one or several components or for movement points which have a comparatively large surface to be lubricated.

According to one embodiment of the present invention the lubricating device may advantageously include a spot lubricant dispenser. With such a spot lubricant dispenser the lubricant is dispensed in a punctiform and/or linear pattern. Such a spot lubricant dispenser is for example especially suitable for joints or pivot points, but also for sliding surfaces in telescopic connections.

In order to avoid freezing up of the lubricant source or the lubricant in a lubricant line, or in order to avoid an undesirable high viscosity in the lubricant the at least one lubricant source and/or lubricant line includes a heating device for heating the lubricant.

According to an especially preferred embodiment of the invention the lubricating device includes a pressure sensor. The pressure sensor captures a lubricant pressure in the lubricant source or in a lubricant line, in particular directly before, or in the region of, a lubricant distributor. It can thus be detected when the lubricant source runs short and is to be replaced or refilled.

Notably, a warning device is provided which is arranged to indicate a refill requirement in the at least one lubricant source and/or to indicate a fault in the lubricating device. Such a warning device receives signals from the at least one pressure sensor in order to capture a refill requirement and/or a fault condition therefrom.

The communication of the pressure sensor and/or the warning device or of at least one of the herein referred to control devices can occur wired or wireless, for example via WiFi, infrared, radio, Bluetooth, etc. The control devices and/or warning devices operate in particular fully automatically, in other words without intervention being necessary by the vehicle operator or other personnel.

The lubrication interval, the lubricant volume for the respective joint and/or movement point, and a relevant lubricating concept is specified according to individual requirement and is programmed in particular into the at least one control device. An external interphase to a master control system is provided, in order to optimize the control and/or read out the data The spot lubricant dispenser and/or the lubricant spray head can, for example, include an electric drive to dispense the lubricant. Alternatively, lubricant delivery occurs in the spot lubricant dispenser through gravity or through overpressure in the lubricating device.

The lubricant spray head can, for example, produce a lubricant mist, in particular an oil mist. The spot lubricant dispenser can in particular deliver lubricants—for example oil—in droplet form.

Preferred lubricants are oil, but also grease, which has a comparatively greater viscosity than oil, can be used. Different lubricant sources include different lubricants, for example oil and grease.

The inventive lubricating device can also be combined with conventional lubricating nipples and manual lubrication.

The lubricant may also include anticorrosive agents.

In addition to the lubricant a cleaning agent may be provided to clean the components prior to lubrication or to clean components which do not require lubrication.

The capacities of the different lubricant sources can deviate from one another and can be adapted to the respective application.

To guide lubricants inside the lubricant lines or respectively to the joints and/or movement points, electromotive drives, hydraulic drives or pneumatic drives can be provided. Generation of a driving pressure by way of a pressure accumulator is also a consideration. A mechanical drive or a gas drive can generate a pressure of 2 to 8 bar, in particular 5 bar. An electric drive, for example, can generate significantly higher pressures, for example, higher than 10 bar or 20 bar, in particular 30 bar or higher. With such an electric drive a piston pump or rotary pump are notably considered. With a mechanical drive a spring-loaded piston may, for example, be provided; with a gas driven drive, for example, a gas loaded piston or simply a lubricant pressure chamber with gas pressure.

The lubrication device includes sensors to capture a proper operating condition. In addition to the at least one referred to pressure sensor, temperature sensors are for example also a consideration.

Energy sources for the lubrication device to be considered are batteries, accumulators or also an on-board electrical power supply.

The traction coupling may for example be in the embodiment of a center buffer coupling, automatic traction coupling, AAR-coupling, coupling with Willison profile, articulated coupling, or telescopic coupling. A combination of several coupling types is also possible. The list is non-conclusive.

The AAR coupling is used for example in USA. AAR is the abbreviation for the Standards Organization: Association of American Railroads.

An additional design example of a traction coupling is a UIC center buffer coupling.

Based on the invention a maintenance interval for the traction coupling can be significantly increased. This reduces personnel expenses and downtimes.

The lubricant amount delivered to the movement points and/or joints can be adjusted, targeted to specific requirements and avoids excessive lubrication. This aids in saving lubricants and protects the environment.

Since difficult to access lubrication points no longer have to be lubricated manually, operational safety is improved.

As described, a refill warning signal can be produced which is recognizable in the driver's compartment and/or in the coupling region. This simplifies service.

The lubrication device is preferably designed as a closed circuit. Thus, no contaminations occur in the lubricant or through the lubricant.

Dry runs are reliably avoided due to the precisely controllable lubricant amounts.

A lubrication process can be adapted to a respective joint and/or movement point, wherein parallel lubricant sources can be provided, for example with a viscous lubricating grease from a first lubricant source and with a lubricating oil from a second lubricant source, which is, in particular, connected to one or more lubricant heads.

The provision of at least one protective housing around the at least one lubricating source provides protection against weather conditions and contaminations. Usability of the inventive lubricating device is extremely flexible and permits new designs of traction couplings since the lubricating points no longer have to be accessed manually.

The respective lubricant dispenser can be positioned near—joints and/or movement points—in the region to be lubricated. Lubricating nipples can also be supplied with the lubricating device.

The fill volume of the lubricant source can easily be controlled.

According to one embodiment of the invention, lubrication is combined with cleaning. For this purpose the lubricating device can include a cleaning device, which cleans the respective—joint and/or movement point—before application of the lubricant, for example, by spraying a cleaning agent. The same spray heads may possibly be used for both the cleaning agent and the lubricant.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is an illustration analogous to FIG. 1, also having three components for which respectively always one dedicated lubricant source can be provided or at least one common lubricant source and the joints and/or movement points of which are lubricated by the inventive lubricating device;

FIG. 3b is an example for an especially advantageous design having a central lubricating device and arrangement of the central lubricant source on the vehicle;

FIG. 3c illustrates a maintenance unit for monitoring the lubricant reserves in the lubricant source and/or for implementing refilling of the lubricant source;

FIG. 7 is a schematic illustration of a lubricant source connected to a coupling rod, which brings lubricant by way of a lubricant line to a plurality of punctiform lubricant dispensers—in assembled state and in exploded view;

FIG. 8 illustrates advantageous lubrication points in the region of a coupling head;

FIG. 16 illustrates exemplary lubrication points in the region of the center position and support of a traction coupling;

FIG. 19 illustrates a design example of a common lubricant source for various lubrication points in the region of a bearing block.

Corresponding reference characters indicate corresponding parts throughout the several views. The exemplifications set out herein illustrates embodiments of the invention and such exemplifications are not to be construed as limiting the scope of the invention in any manner.

DETAILED DESCRIPTION OF THE INVENTION

Figure 1:
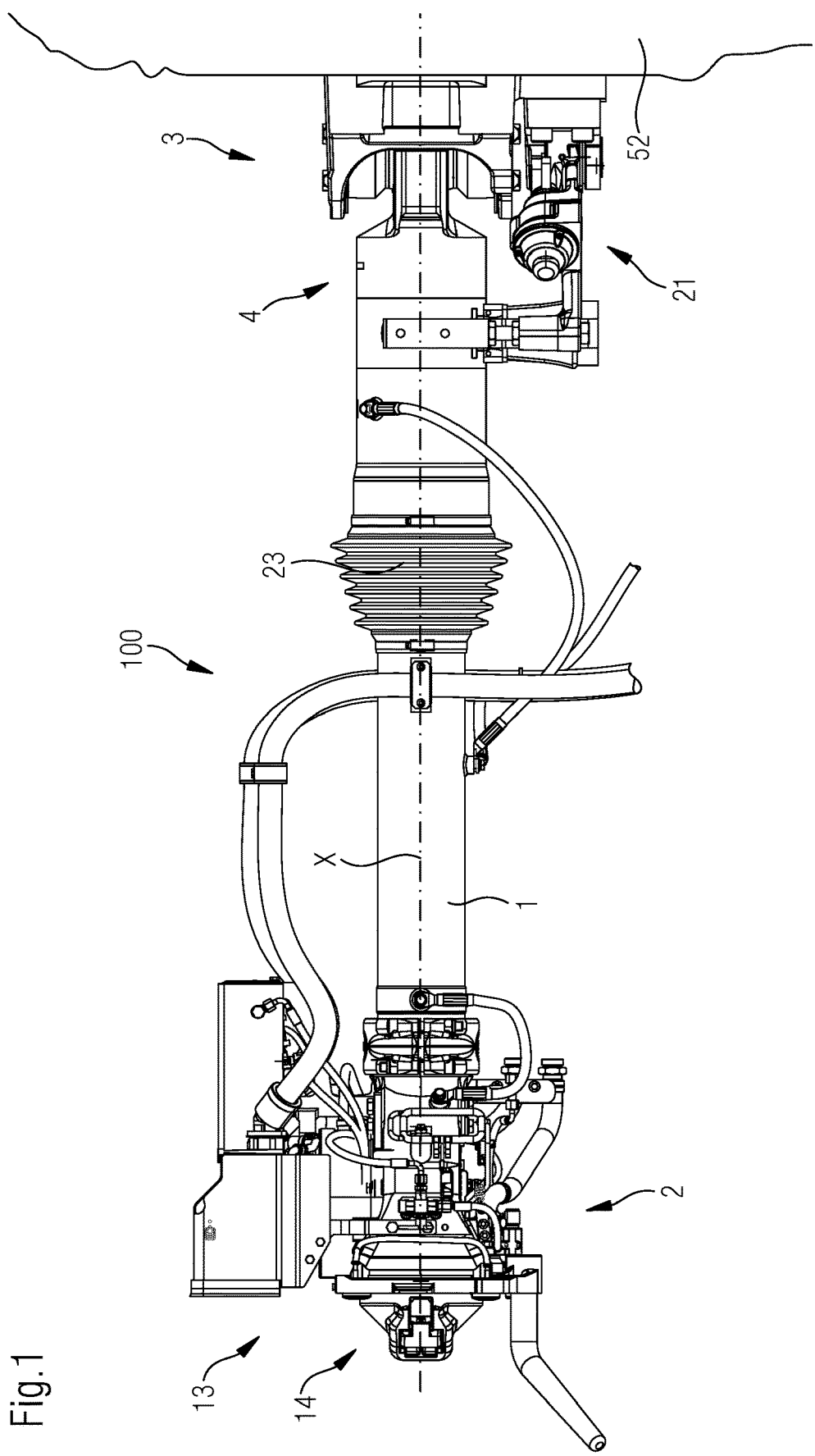
FIG. 1 is a schematic illustration of an embodiment of a traction coupling of the present invention having three components for which respectively always one dedicated lubricant source can be provided or at least one common lubricant source and the joints and/or movement points of which are lubricated my means of the inventive lubricating device.

Referring now to the drawings, and more particularly to FIG. 1 there is shown a side view of a traction coupling 100 with the inventive addition of a central lubricant supply. Traction coupling 100 includes a coupling rod 1, a coupling head 2 and a linkage or respectively a support with a bearing block 3. Coupling rod 1 extends from an attachment end 4 on bearing block 3 to coupling head 2. Bearing block 3 serves the attachment or respectively mounting on a carriage of a vehicle, in particular a rail vehicle 52, not illustrated in detail herein.

The term "bearing block" 3 is to be understood very loosely. The term may refer in particular to a specially designed bearing block 3 consisting of bearing shells and flange region, or a plate.

Moreover, an electric coupling 13 and an air coupling 14 are provided on a face side of coupling head 2. Coupling head 2 also has a mechanical coupling, which includes a cone and a funnel so that coupling head 2 can be mechanically interlocked with an opposing coupling head 2 of another carriage.

Coupling rod 1 extends in the axial direction X, which corresponds to the direction of the longitudinal axis of the relevant rail vehicle 52.

A similar traction coupling 100 is shown in FIG. 2, wherein in the drawings corresponding components are identified with the corresponding reference numbers. In FIGS. 1 and 2 a center reset 21 is especially recognizable which is part of bearing block 3 and which aligns a longitudinal axis of coupling rod 1 in axial direction X with the corresponding axial direction or respectively a longitudinal axis of the rail vehicle.

Also, a primary bolt 22 of coupling head 2 is more easily recognizable in FIG. 2 than in FIG. 1. In the arrangement according to FIG. 1, and in the arrangement according to FIG. 2, coupling rod 1 includes an energy absorption element 23 which absorbs the impact energy. Energy absorption element 23 is reversible. However, combinations consisting of reversible and non-reversible energy absorption is also contemplated.

Joints and/or movement points of coupling rod 1, and also of coupling head 2 and bearing block 3, are preferably lubricated with an inventive lubricating device which is not yet shown in detail in FIGS. 1 and 2.

Figure 3A:
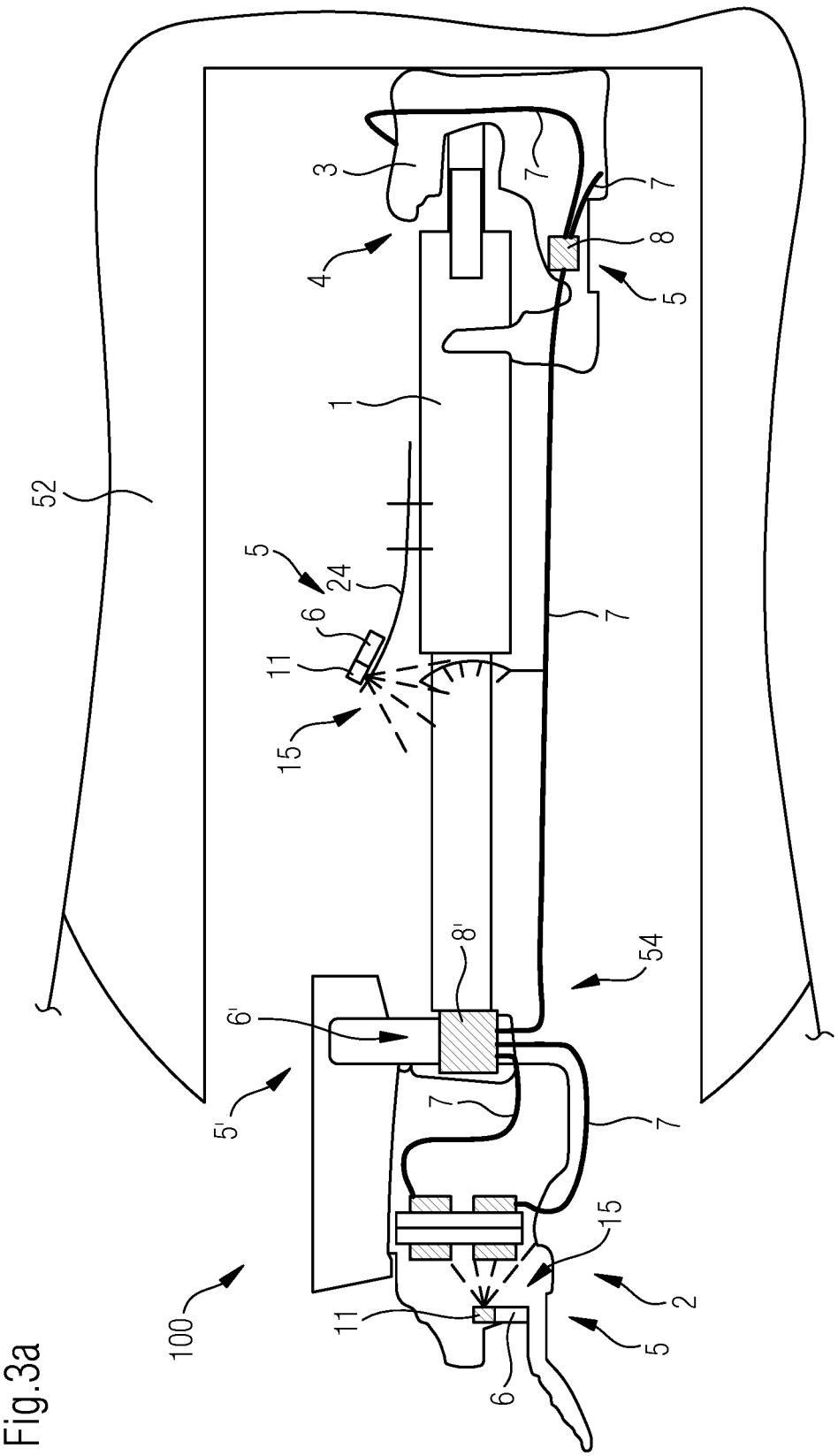
FIG. 3a shows examples for a lubricating device with lubricant spray heads.

FIGS. 3*a* and 3*b* describe two exemplary designs of the fundamental principle, and the general design of inventive embodiments, of traction couplings 100 with lubricant supply systems.

FIG. 3*a* shows an exemplary design with lubricating devices 5 assigned to the individual components with respectively designated lubricant source 6. FIG. 3*a* shows, for example, a traction coupling 100 with three lubricating devices 5, each of which is equipped with a lubricating source 6 and an integrated control device 11. Lubricating device 5 is provided in the region of coupling head 2, one lubricating device 5 in the region of coupling rod 1 and one lubricating device in the region of bearing block 3. In the case of lubricating device 5, in the region of bearing block 3, individual components are not individually recognizable. The individual lubricating devices 5 each serve to supply one or more joints and/or movement points on individual components 1, 2 and 3. These are part of a central lubricant supply system 54, which assumes the function of a central lubricating device. It further includes an additional lubricating device 5' with a lubricant source 6' supplying different components with lubricant. In this case, lubricant source 6' always supplies lubricant to coupling head 2 by way of lubricant lines 7 on individual joints and/or movement points and bearing block 8 on at least two joints and/or movement points by way of lubricant lines 7. For this purpose, lubricant source 6' is arranged on coupling head 2 and is coupled by way of a lubricant distributer 8' with the lubrication points on coupling head 2 and bearing block 3.

Figure 6:
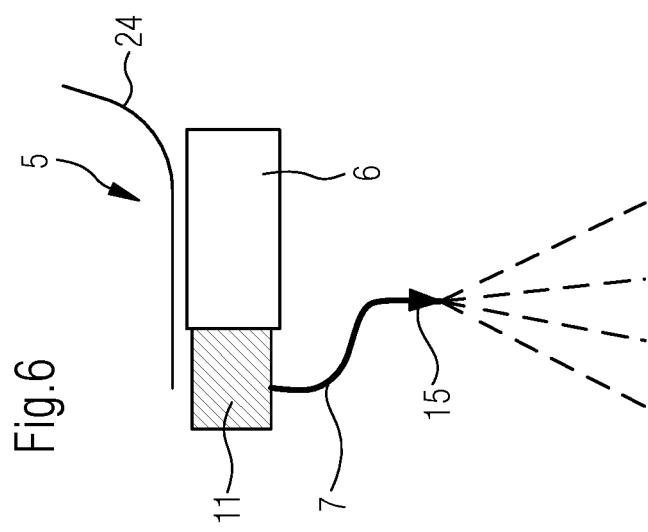
FIG. 6 illustrates an example of a lubricant source with attached control device which guides lubricant via a lubricant line to a lubricant spray head.

An exemplary arrangement for lubricating devices 5 from FIG. 3*a* is shown in FIG. 6. As can be seen, lubricating device 5 is attached on a bracket 24 and could also include a dedicated protective housing. Control device 11 controls the lubricant amount which is fed from lubricant source 6 to lubricant line 7 and from there to lubricant spray head 15.

Control device 11 could also include a relevant drive if the lubricant source is not pressurized. The individually numbered lubricating devices 5 in FIG. 3*a* can be regarded advantageously as an integrated lubricating device arranged in a distributed manner, which has different lubricant sources 6, so that the individual components identified with 5, 5' are parts of the overall lubrication device or respectively lubricant supply system 54.

FIG. 3*b* illustrates an especially advantageous design with a central lubricant supply by way of lubricant source 6 arranged in the connection vicinity of traction coupling 100 on vehicle 52, in particular, rail vehicle 52. In the illustrated case, the arrangement occurs directly on the carriage body or on a component connected with the carriage body. A so-called primary lubricant line 53 connects central lubricant source 6 with a lubricant distributor 8 through which the lubricant is transported by respective lubricant lines 7 to the individual components: coupling head 2, coupling rod 1 and bearing block 3. In the illustrated case, at least one lubricant line 7 is allocated to one component respectively. On the individual components—coupling head 2, coupling rod 1 and bearing block 3—lubricant distributors, which are not shown here in detail, can again be provided which feed the lubricant to the different movement points and/or joints on the respective components 1, 2, 3.

Moreover, a maintenance unit 55, for monitoring the lubricant reserves in the lubricant source 6 and/or for implementing refilling, is allocated in a particularly advantageous manner to lubricant supply system 54, in particular, to lubricant source 6. This can be arranged for example, as shown in FIG. 3*c*. It includes a control device 11 which is coupled with a device for at least indirect detection of the lubricant supply level in the lubricant source 6, wherein coupling occurs wireless, or as shown in FIG. 3*b* by way of cable 59. Control device 11 processes the signal and in the simplest case a corresponding notification 56 is triggered which identifies a refill requirement. Notification 56 may indicate that the necessary minimum level in lubricant source 6 has been reached. Maintenance unit 55 moreover includes a connection 57 for refilling, which is connected by way of a line 58 with lubricant source 6. Maintenance unit 55 is arranged at a distance to lubricant source 6 and based on its possible connection with lubricant source 6 permits location of lubricant source 6 in less accessible locations.

In the event of appropriate accessibility, it is also conceivable to implement refilling directly at lubricant source 6.

Figure 4:
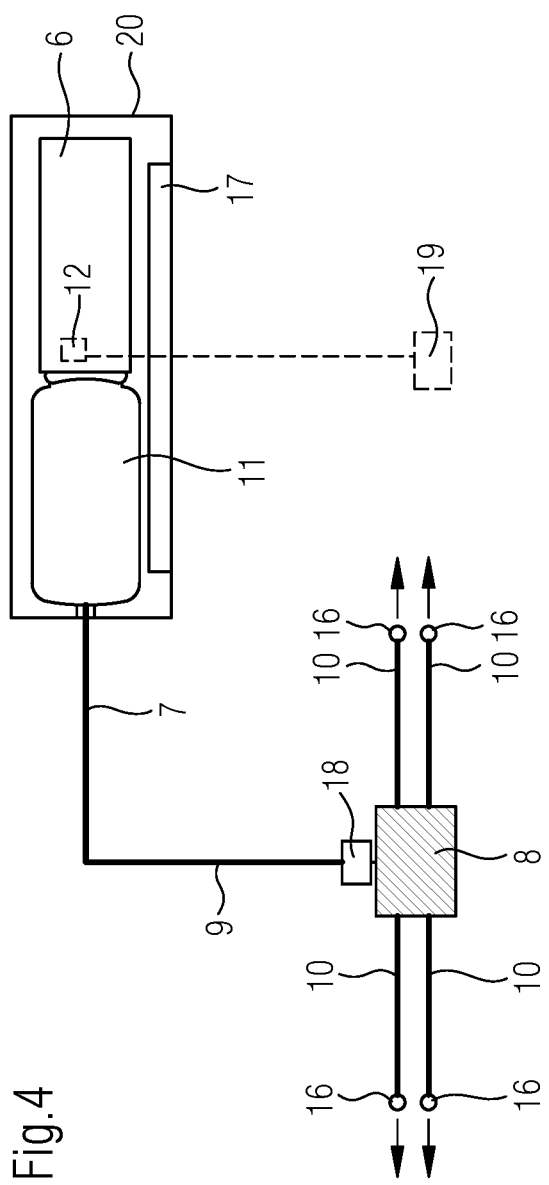
FIG. 4 is an example of a lubricating source, located in a protective housing together with a control device and a drive unit, wherein the lubricating source delivers lubricant by way of a lubricant distributor to the joints and/or movement points.

Shown in FIG. 4 is an exemplary alternative arrangement for lubricant supply from a lubricant source 6 to relevant lubricating points (joints and/or movement points in the traction coupling). Lubricant source 6 is for example in the embodiment of a cartridge with lubrication grease, located in a protective housing 20. Also located in protective housing 20 is a control device 11, which includes an integrated drive device or valve device for the lubricant. Protective housing 20 also has a heating device 17 for heating lubricant source 6 and for heating the lubricant in the drive device/valve device of control device 1.

The lubricant from lubricant source 6 is fed by way of lubricant line 7 to a lubricant distributor 8, which in addition to lubricant supply line 9 in this case, includes four lubricant discharge lines 10, wherein each discharge line 10 leads to a designated joint and/or movement point or wherein several discharge lines 10 may lead to the same joint and/or movement point.

Lubricant supply line 9 is formed by the last segment of the herein illustrated lubricant line 7 and has a pressure sensor 18, which can detect a drop in pressure if the lubricant level in lubricant source 6 runs low, as a result of which lubricant line 7 is no longer filled with the required pressure. As indicated by the dashed lines, a lubricant sensor 12 may be provided in addition or as an alternative in lubricant source 6, which detects lubricant running low in lubricant source 6.

Lubricant sensor 12 and/or pressure sensor 18 can be connected with a warning device 19, which would indicate an impermissibly low lubricant level in lubricant source 6. Warning device 19 may, for example, be provided in the driver's compartment or on the traction coupling.

The lubricating points, which are supplied by way of lubricant distributor 8 are in particular punctiform or linear lubricating points and are respectively supplied with lubricant, by at least one point lubricant dispenser 16. However, this is not mandatory.

Figure 5:
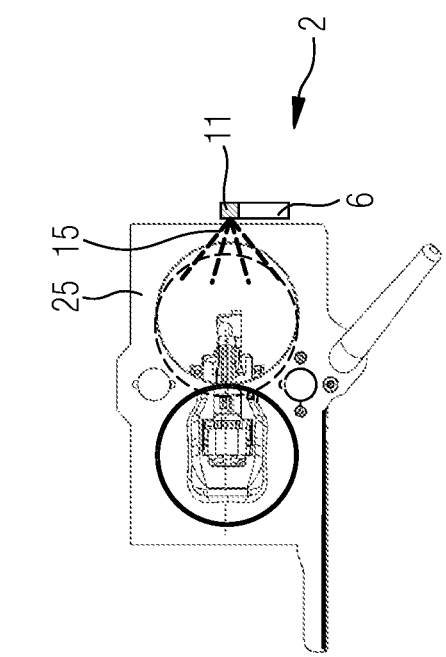
FIG. 5 is an example for a joint in the coupling lock of the coupling head, wherein the joint is sprayed with lubricant by a lubricant spray head.

FIG. 5 is a front end top view onto a face plate 25 of coupling head 2. Coupling closure 26 in the funnel of face plate 25 is herein supplied with lubricant with a lubricant spray head 15 from a separate lubricant source 6. Accordingly, a comparatively large area is being sprayed with lubricant.

In contrast, FIG. 7 shows a plurality of point lubricant dispensers 16, positioned in circumferential direction, one behind another, around coupling rod 1, in order to spray lubricant in a linear region. Point lubricant dispensers 16 are connected by way of a corresponding annular lubricant distributor 8 to lubricant line 7, which transports lubricant out of lubricant source 6. Lubricant distributor 8 is mounted to a bracket 24, which also supports lubricant source 6, preferably in a replaceable manner. Lubricant source 6 may, for example, be a pressurized cartridge.

FIG. 8 shows exemplary lubricating points, which can be lubricated with inventive lubricating device 5, and which, are only provided in the region of coupling head 2. The lubricating points are as follows:
- 31—Guide surfaces in cones and funnels
- 32—front surface of face plate 25
- 33—bar of couple eyelet
- 34—circumferential surface of primary bolt
- 35—hook aperture of center component
- 36—back side of center component
- 37—pressure surface of plunger guide
- 38—spring bracket
- 39—backside of jack rod
- 40—drainage bores which must be kept open and supplied accordingly with a lubricant and/or cleaning agent.

Figure 9:
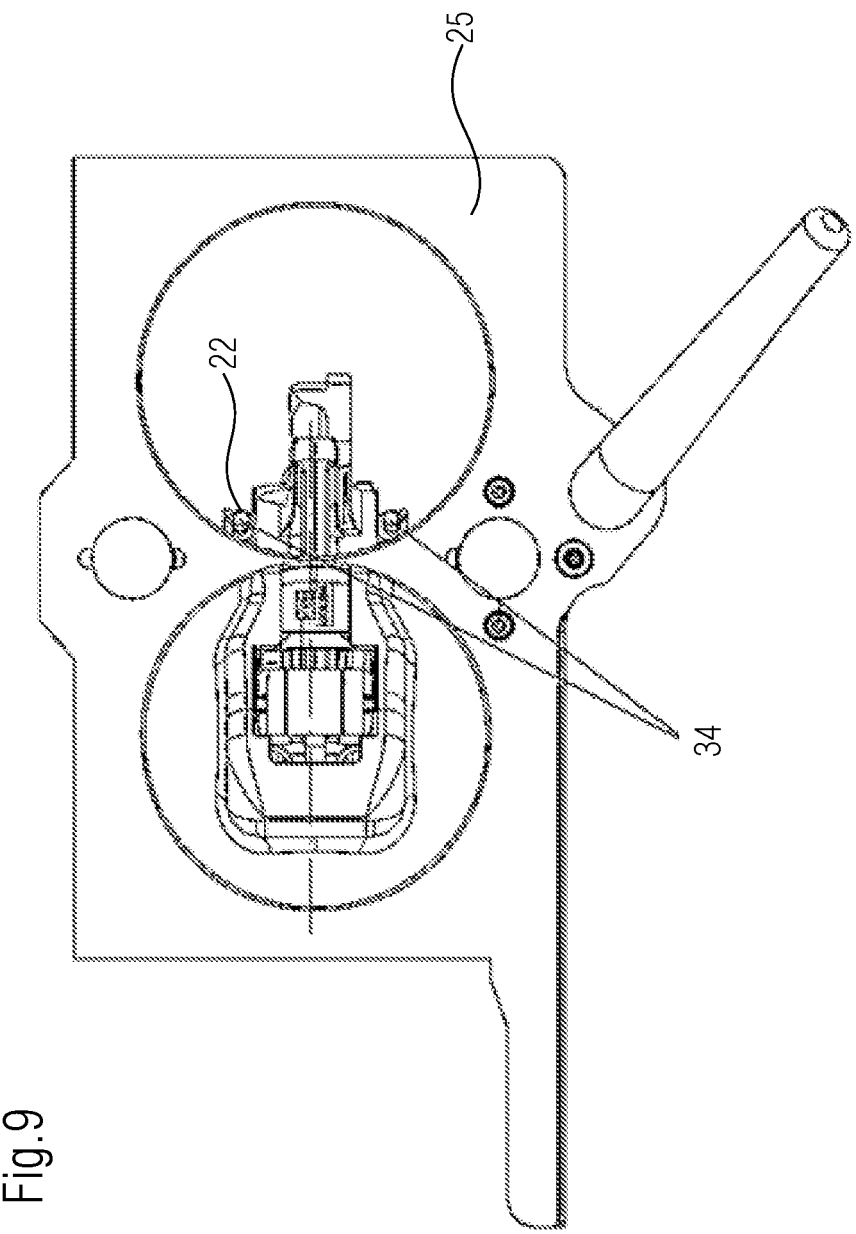
FIG. 9 shows additional lubrication points in the region of the coupling head.

FIG. 9 is another example of a lubricating point in the form of lubricating point 34 of primary bolt 22, shown in a front view of face plate 25.

Figure 10:
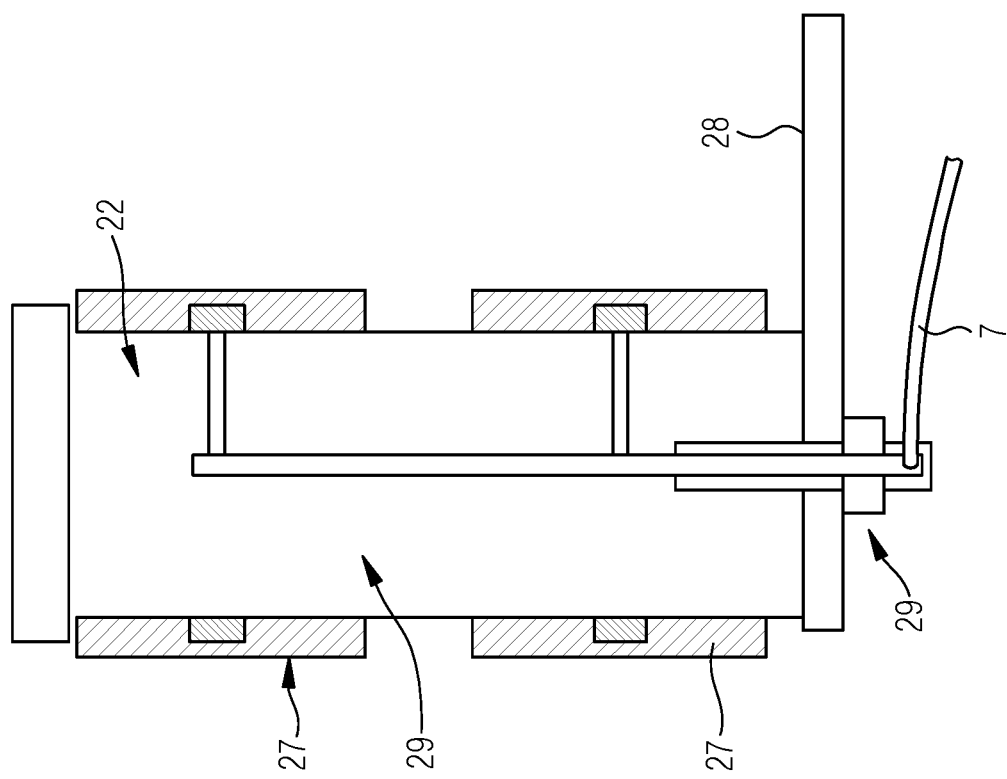
FIG. 10 illustrates exemplary lubrication points in the region of the main bolt of a traction coupling head.

FIG. 10 shows a schematic view for the lubrication of primary bolt 22. Bolt 22 is mounted in at least one bushing 27 and is operable by way of a decoupling lever 28 for release of two mechanical couplings.

A lubricating channel 29 is integrated into primary bolt 22, which is supplied with lubricant by way of lubricant line 7. Lubricating channel 29 extends on the front into primary bolt 22 in a longitudinal direction of bolt 22 and has radial branches for lubricating the circumferential surface between primary bolt 22 and the at least one bushing 27.

As illustrated, bushing 27 can have a radial inner circumferential recess in order to better distribute the lubricant over the circumference of primary bolt 22.

It is also feasible to lubricate an exposed surface of primary bolt 22 in an axial direction of primary bolt 22 between two bushings 27, for example by spraying lubricant, as previously described.

Figure 11:
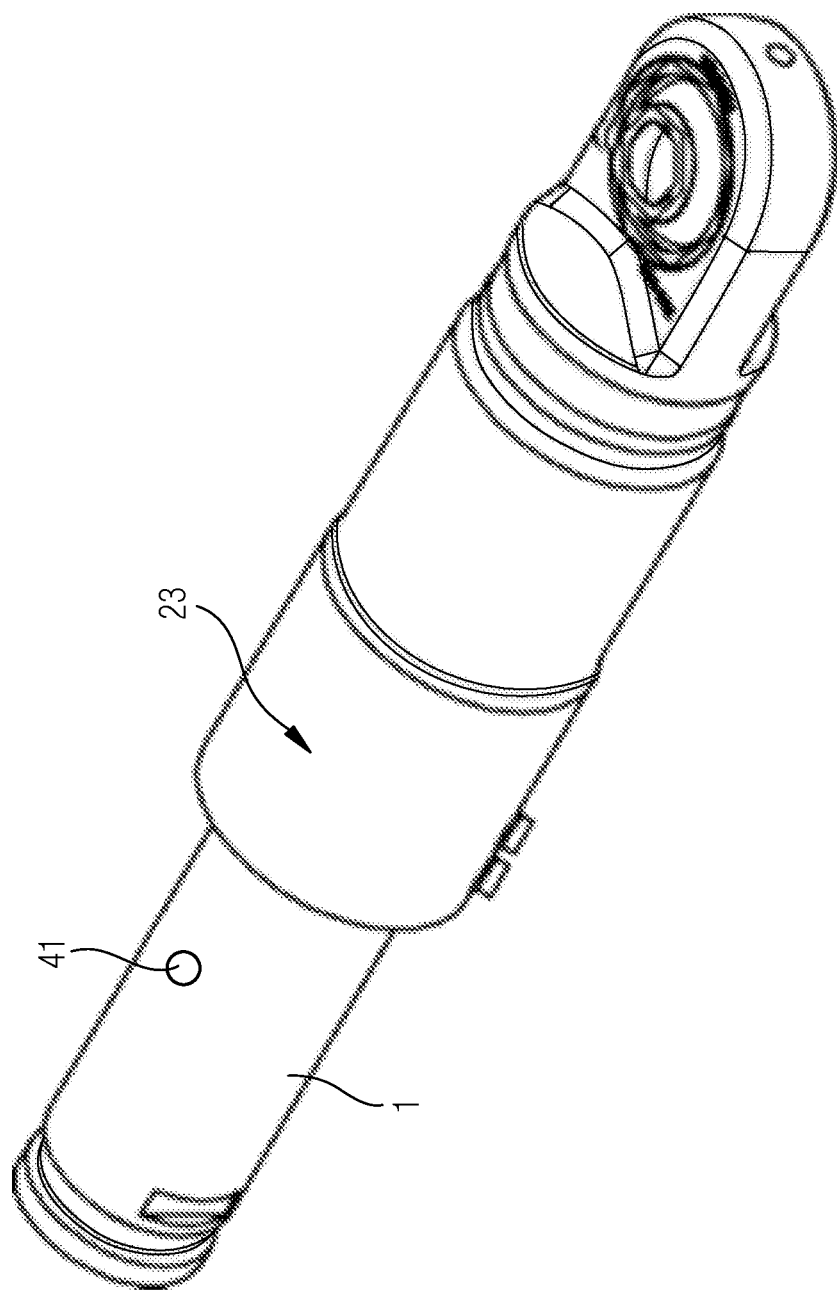
FIG. 11 illustrates a lubrication point on the sliding surface of the regenerative energy absorption element in the coupling rod.

FIG. 11 shows another advantageous position of a lubricating point 41, which can be produced specifically with a lubricant spray head 15, as shown in FIG. 3—in order to lubricate coupling rod 1 in a region that retracts and extends when energy absorption element 23 is activated.

Figure 12:
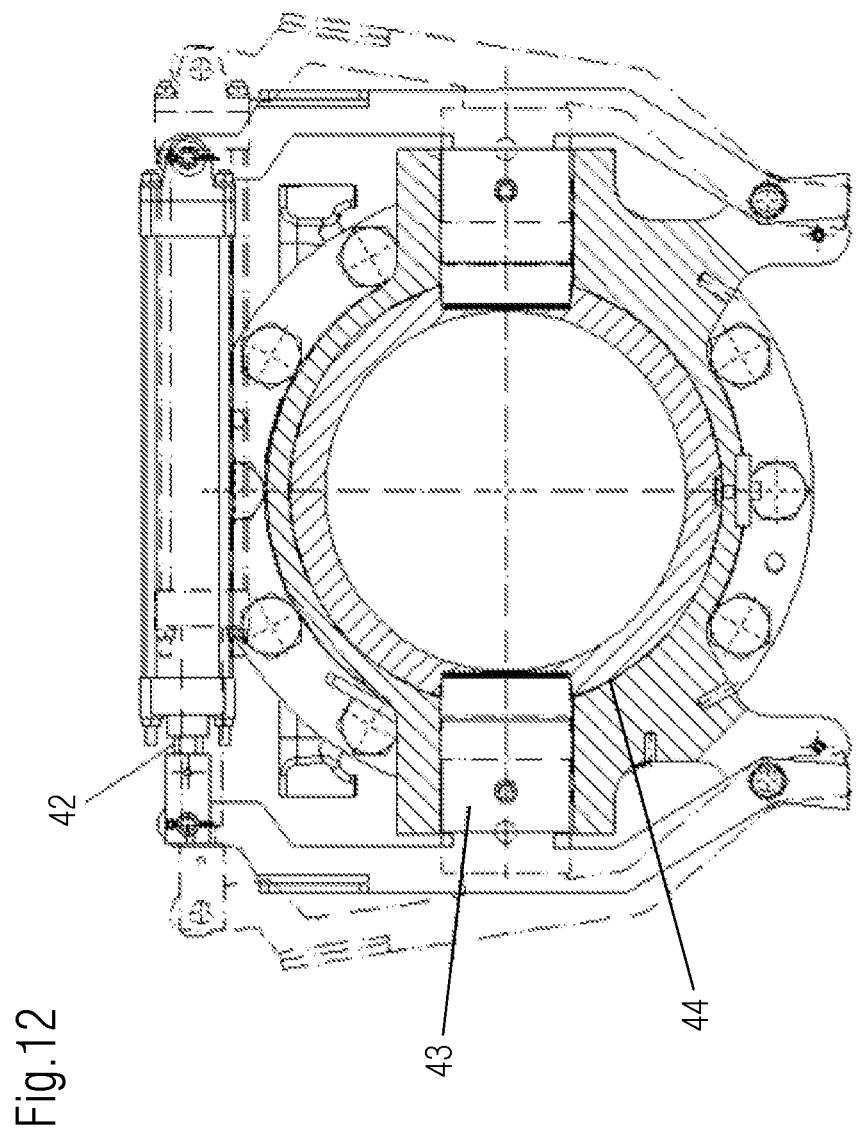
FIG. 12 illustrates exemplary lubrication points in the region of a telescopic coupling.

FIG. 12 shows additional lubricating points, which can be lubricated according to the invention. Reference 42 identifies herein the piston rod of a locking cylinder; 43 identifies running surfaces of the locking cylinder and 44 identifies running surfaces of the inner tube.

Figure 13:
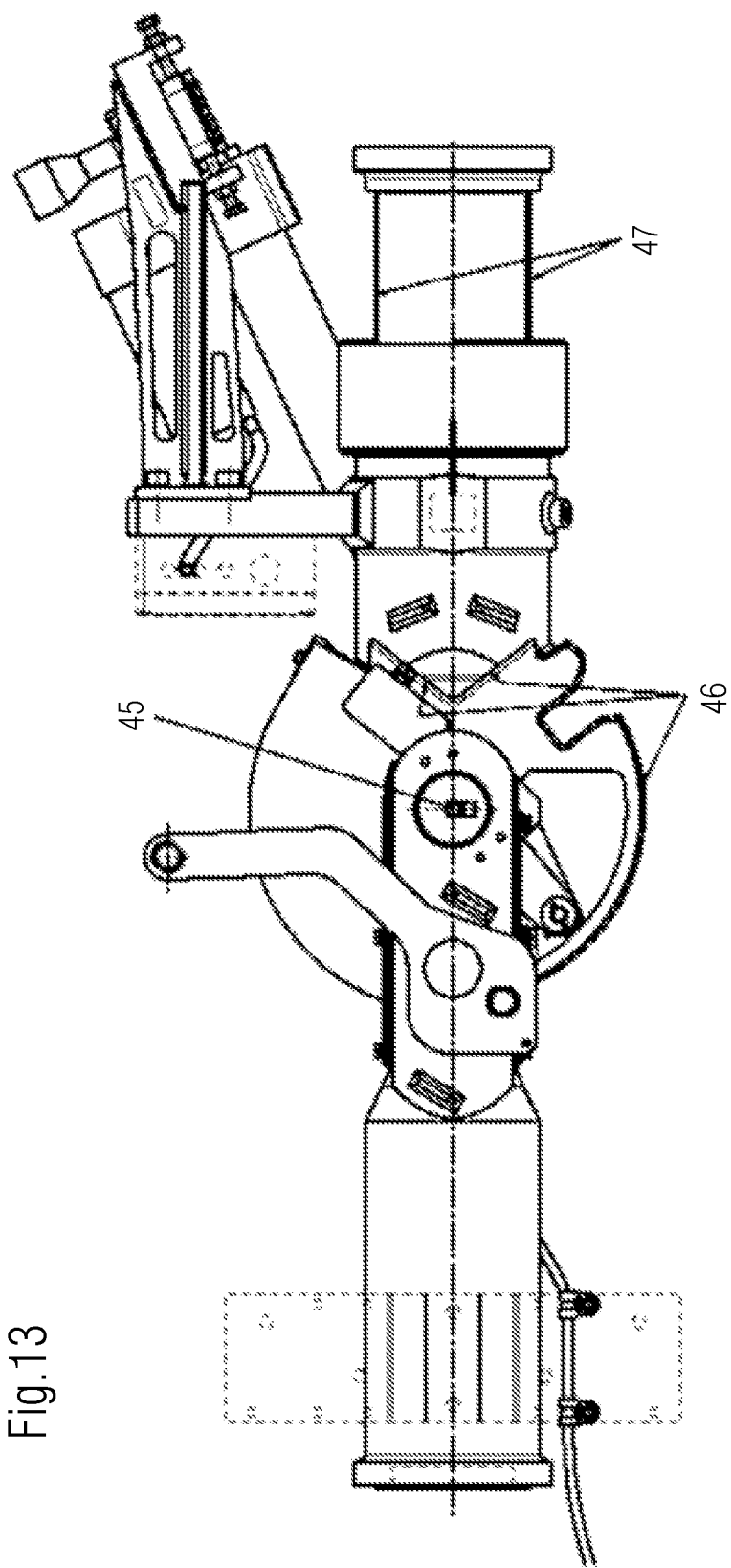
FIG. 13 illustrates exemplary lubrication points in the region of a coupling with an articulated joint.

FIG. 13 also shows advantageous lubricating points which can be lubricated according to the present invention. These are: bolt bearing 45 of the primary bolt in an articulated joint, wherein the lubrication occurs by way of conical grease nipples; moreover gliding surfaces 46 of the detent mechanism and of the track of the latch in the articulated joint; and gliding surfaces 47 of the regenerative energy absorption element.

Figure 14:
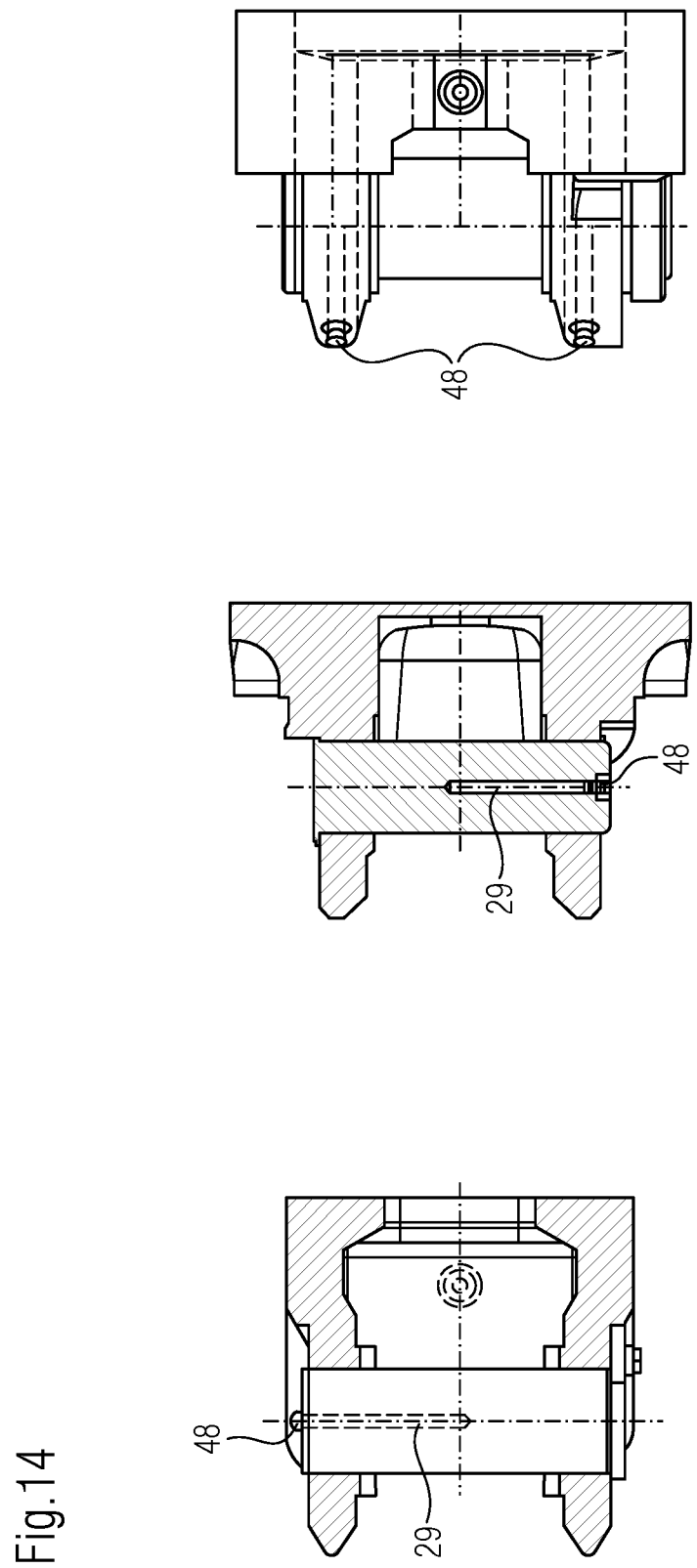
FIG. 14 illustrates exemplary lubrication points in the bearing block.

FIG. 14 shows exemplary lubricating points on bearing block 3. The lubricating points are supplied by way of a lubricant source and line which are not shown in detail, and which are connected to grease nipples 48. A lubricating channel 29 may again be provided in the bolt, as well as a lubricant supply for the circumferential surfaces by way of radially positioned grease nipples 48

Figure 15:
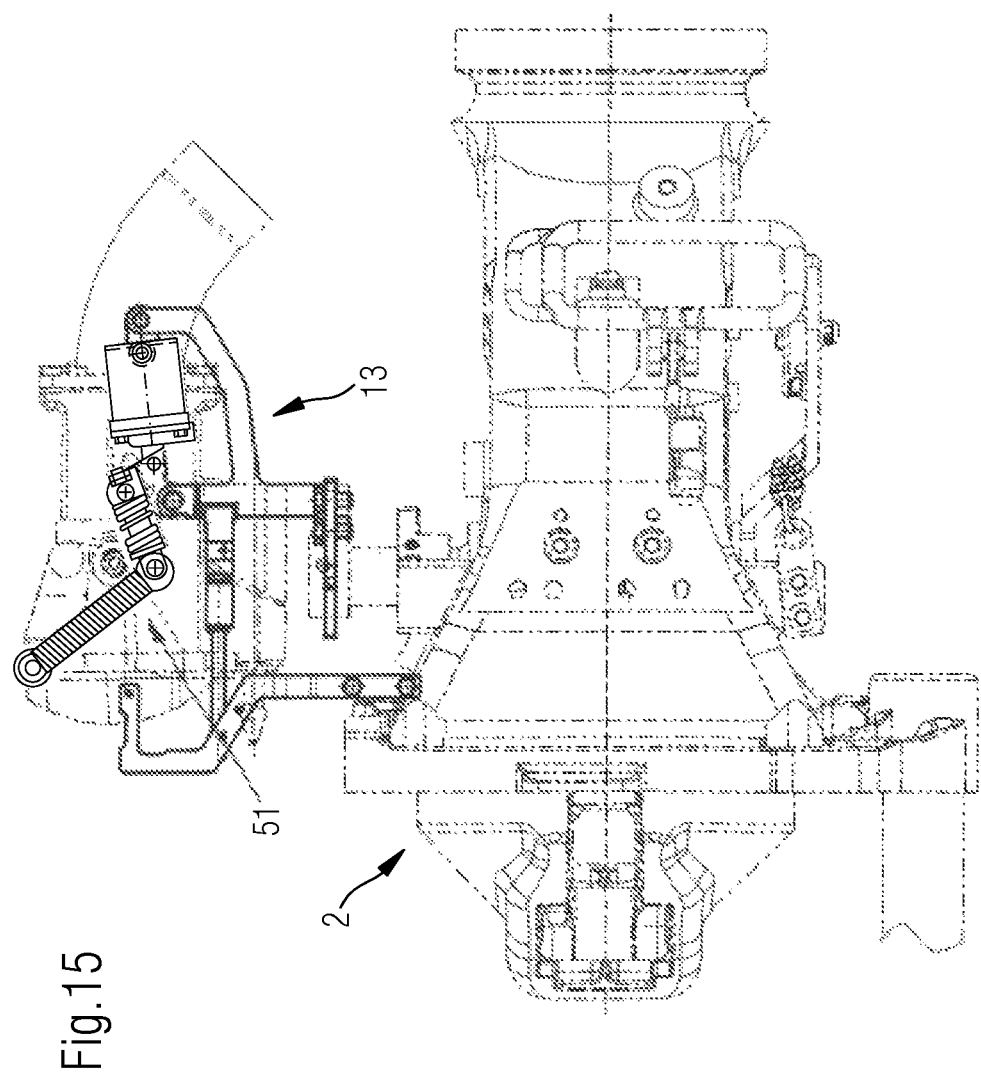
FIG. 15 illustrates exemplary lubrication points on an actuation of an electric coupling.
Figure 18:
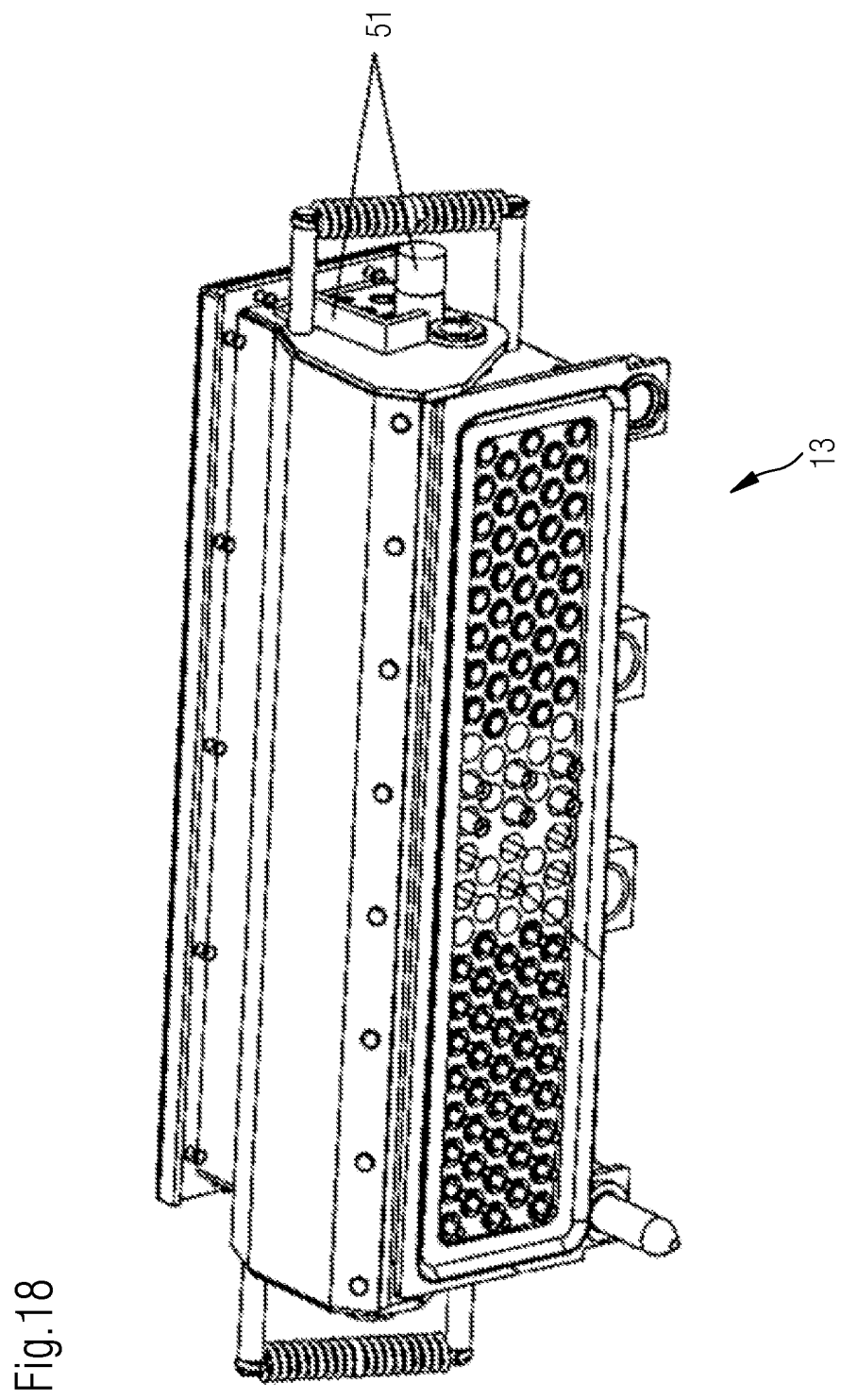
FIG. 18 illustrates exemplary lubrication points on an electric coupling.

According to the illustration in FIG. 15 valve guides 51 on electric coupling 13 located on coupling head 2 are being lubricated. This is also shown again in FIG. 18 in a top view—diagonally towards the front onto electric coupling 13.

According to the illustration in FIG. 16 running surfaces 49 of the cam disk are lubricated according to the invention at a center position 21 and support, which is provided in the region of bearing block 3. For lubrication of the mounting of the bolt, a lubricating channel 29 is provided, which can be supplied by way of a grease nipple 48 with lubricant from an inventive lubricating device of the present invention.

Figure 17:
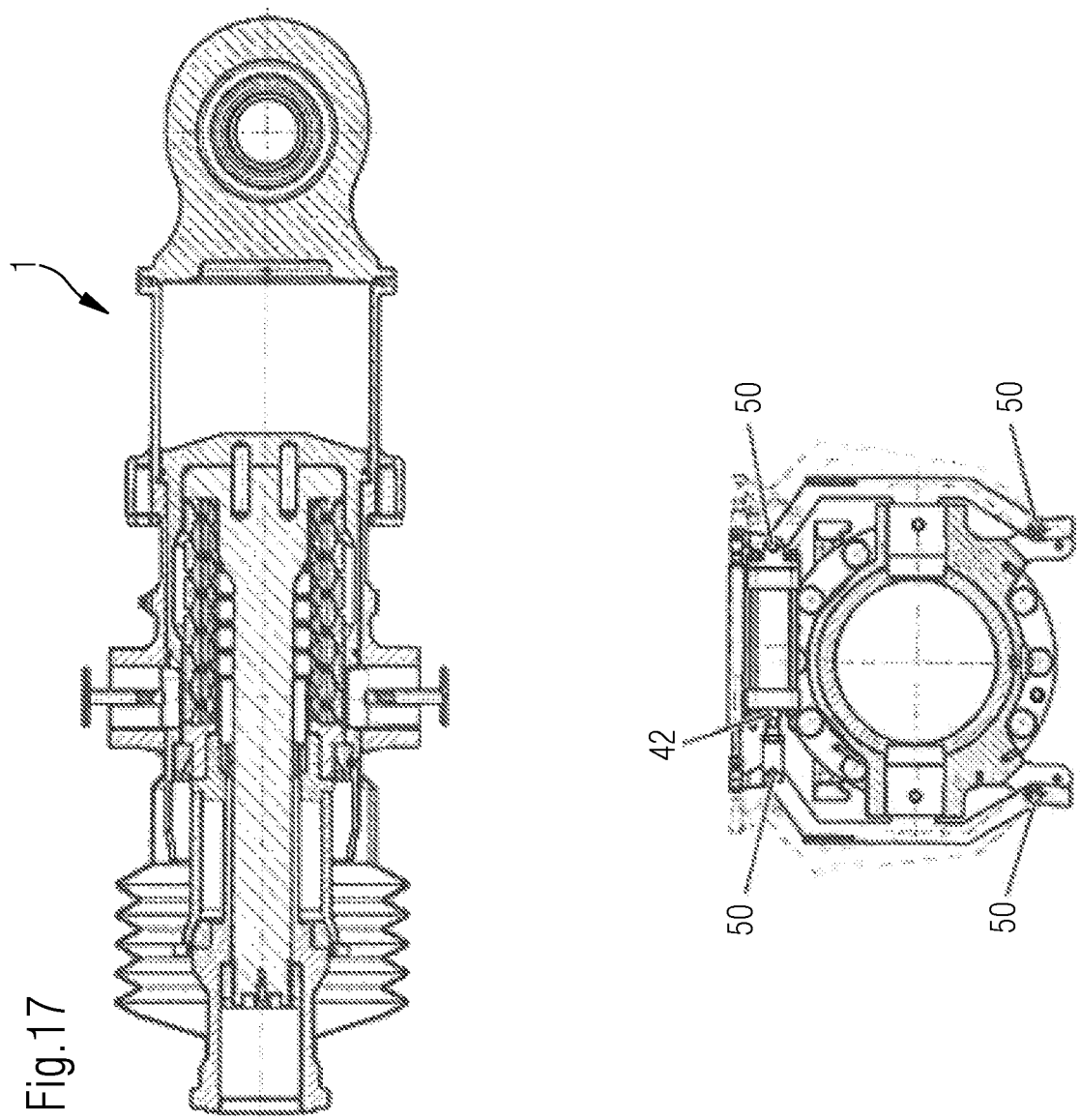
FIG. 17 illustrates exemplary lubrication points in the region of the coupling rod.

On coupling rod 1 according to FIG. 17, joint points 50 of the locking device are lubricated as lubricating points according to the invention. For further explanation of the locking device we refer to FIG. 12. The lubricating point on piston rod 42 of the locking cylinder is also shown again.

FIG. 19 illustrates again schematically how, in the region of bearing block 3 various lubricating points can be lubricated from one common lubricating source 6. A lubricant distributor 8 is provided for this purpose, in the illustrated example directly in the region of lubricant source 6, which feeds various lubricant lines 7, in the form of lubricant line branch-offs 10, in order to deliver lubricant to the various lubricating points.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LISTING

1 Coupling rod
2 coupling head
3 bearing block
4 attachment end
5, 5' lubricating device
6, 6' lubricant source
7 lubricant line
8 lubricant distributor
9 lubricant supply line
10 lubricant discharge line
11 control device
12 lubricant sensor
13 electric coupling
14 air coupling
15 lubricant spray head
16 point lubricant dispenser
17 heating device
18 pressure sensor
19 warning device 20 protective housing
21 center reset
22 primary bolt
23 energy absorption element
24 bracket
25 face plate
26 coupling lock
27 bushing
28 decoupling lever
29 lubricating channel
31 guide surfaces in cones and funnels
32 front surface of face plate 25
33 bar of couple eyelet
34 circumferential surface of primary bolt
35 hook aperture of center component
36 back side of center component
37 pressure surface of plunger guide
38 spring bracket
39 backside of jack rod
40 drainage bores which must be kept open and supplied accordingly with a lubricant and/or cleaning agent
41 lubricating point
42 piston rod of locking cylinder
43 running surfaces of locking cylinder
44 running surfaces of inner tube
45 bolt bearing of the primary bolt in the articulated joint
46 gliding surfaces 46 of the detent mechanism and of the track of the latch in the articulated joint
47 gliding surfaces of the regenerative energy absorption element
48 grease nipple
49 running surfaces of the cam disks
50 joint points
51 valve guide on electric coupling
52 vehicle
53 main lubricating line
54 lubricant supply system
55 maintenance unit
100 traction coupling

What is claimed is:

1. A traction coupling, comprising:
a coupling rod;
a bearing block;
a coupling head supported by the coupling rod, the coupling rod extends in an axial direction from an attachment end to the coupling head, in a region of the attachment end, the coupling head is mounted in a pivotable manner on the bearing block of the traction coupling in order to be attached to a rail vehicle; and
at least one lubricating device including:
at least one lubricant source; and
at least one lubricant conveying lubricant line connected to the at least one lubricant source for lubrication of joints and/or movement points in the traction coupling, wherein the joints and/or movement points of various components of the following group of components of the traction coupling are lubricated with the at least one lubricating device:
the coupling rod;
the coupling head; and
the bearing block;
wherein the at least one lubricant source is provided for lubrication of the joints and/or movement points of the components in the group of components;
wherein the at least one lubricant source is arranged on one of the components in the group of components or is in the vicinity of a connection of the bearing block on a carriage of the rail vehicle; and
at least one lubricant distributor positioned between the at least one lubricant source and the various joints and/or movement points of at least one of the components, the at least one lubricant distributor having at least one lubricant supply line coupled thereto, and a plurality of lubricant discharge lines coupled thereto.

2. The traction coupling according to claim 1, wherein the at least one lubricant source is a plurality of lubricant sources with at least one of the plurality of lubricant sources being provided for each component in the group of components.

3. The traction coupling according to claim 2, wherein each of the lubricant sources is fastened to the respective component or is integrated into the respective component.

4. The traction coupling according to claim 3, wherein the lubricant sources each with respective lubricant lines of the components connected thereto are separated from one another.

5. The traction coupling according to claim 1, further comprising at least one control device controlling lubricant delivery from the at least one lubricant source so that the delivery of lubricant occurs continuously.

6. The traction coupling according to claim 1, further comprising at least one control device controlling lubricant delivery from the at least one lubricant source so that the delivery of lubricant occurs at regular intervals or in a discontinuous manner based on a requirement request to the control device which occurs by way of a lubricant sensor which is connected to the respective joint and/or movement point and detects a lubricant status at the joint and/or movement point, and/or by way of a pressure sensor in the lubricant line.

7. The traction coupling according to claim 1, wherein the joints and/or movement points include at least two of the following areas:
one or several of the joints or pivot points between two components of the traction coupling;
one or more of the movement points between two components movable relative to each other in the axial direction or in a perpendicular or an angular direction relative to the axial direction;
one or more of the movement points between two components movable relative to each other in the circumferential direction to the axial direction;
one or more of the movement points on actuating mechanisms of one or more integrated components in the coupling head, the integrated components being an electric coupling and/or an air coupling;
one or more outside surfaces on one or more of the components;
one or more inside surfaces on one or more of the components; and/or
one or more interior spaces of the traction coupling.

8. The traction coupling according to claim 1, wherein the lubricating device includes at least one lubricant spray head for spraying of a surface with lubricant.

9. The traction coupling according to claim 8, wherein the lubricating device further includes at least one spot lubricant dispenser for dispensing lubricant in a punctiform and/or linear pattern.

10. The traction coupling according to claim 1, wherein the at least one lubricant source includes a heating device for heating the lubricant.

11. The traction coupling according to claim 1, wherein the lubricating device includes a pressure sensor which captures a lubricant pressure in the at least one lubricant source or in the lubricant line, directly before or in the region of a lubricant distributor.

12. The traction coupling according to claim 11, further comprising a warning device arranged to indicate a refill requirement in the at least one lubricant source based on signals transmitted by the pressure sensor and/or to indicate a fault in the lubricating device.

13. The traction coupling according to claim 1, wherein the traction coupling is designed according to at least one of the following coupling types:
- a center buffer coupling type;
- an automatic traction coupling type;
- an AAR-coupling type;
- a coupling type with a Willison profile;
- an articulated coupling type; or
- a telescopic type coupling.

\* \* \* \* \*